US008520936B2

(12) United States Patent
Romney

(10) Patent No.: US 8,520,936 B2
(45) Date of Patent: Aug. 27, 2013

(54) METHOD AND APPARATUS FOR USE OF AN UNIVERSAL COLOR INDEX (UCI): A COLOR APPEARANCE SYSTEM CALIBRATED TO REFLECTANCE SPECTRA

(75) Inventor: A. Kimball Romney, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1518 days.

(21) Appl. No.: 12/113,924

(22) Filed: May 1, 2008

(65) Prior Publication Data

US 2008/0285844 A1    Nov. 20, 2008

Related U.S. Application Data

(60) Provisional application No. 60/915,533, filed on May 2, 2007.

(51) Int. Cl.
*G06K 9/00* (2006.01)
(52) U.S. Cl.
USPC .......................................... 382/162
(58) Field of Classification Search
None
See application file for complete search history.

(56) References Cited

U.S. PATENT DOCUMENTS

| | | | | |
|---|---|---|---|---|
| 4,843,573 A * | 6/1989 | Taylor et al. | ................... | 345/591 |
| 6,549,653 B1 * | 4/2003 | Osawa et al. | ................... | 382/162 |
| 6,980,231 B1 * | 12/2005 | Ohsawa | ........................ | 348/188 |
| 7,030,917 B2 * | 4/2006 | Taubman | ....................... | 348/273 |
| 7,777,916 B2 * | 8/2010 | Owens | ............................ | 358/1.9 |
| 7,860,304 B2 * | 12/2010 | Tin | ................................ | 382/162 |
| 8,031,938 B2 * | 10/2011 | Edge | ............................ | 382/167 |
| 2004/0071339 A1 * | 4/2004 | Loce et al. | ..................... | 382/162 |
| 2008/0137941 A1 * | 6/2008 | Tin | ................................ | 382/162 |
| 2009/0257648 A1 * | 10/2009 | Edge | ............................ | 382/162 |

OTHER PUBLICATIONS

D'Andrade "A quantitative model for Transforming reflectence into the munsell color space using conde sensativity function and opponent process weights" PNAS 2002 vol. 100 pp. 281-286.*
Romney et al. "A model for the simultaneous anaylsis of reflectance spectra and basis factors of munsell color samples under D 65 illuminaion in three-dimensional color space" Proceedings of the national academy of science 2002.*

* cited by examiner

*Primary Examiner* — David Zarka
*Assistant Examiner* — Sean Motsinger
(74) *Attorney, Agent, or Firm* — Marcus C. Dawes; Daniel L. Dawes

(57) ABSTRACT

A method for establishing a relationship between a physical structure of reflectance spectra as defined in a Euclidean color space and a perceptual space of color appearance defined in terms of human perception of colors is performed by obtaining a cube root spectrum of the physical reflectance spectrum in a selected spectral range, reconstructing the cube root of the physical reflectance spectrum by a weighted linear combination of three basis functions, the weights of the linear combination of the basis functions constituting the coordinates in a three-dimensional Euclidean color space with respect to which similarities and differences among reflectance spectra in metric terms and a color characterized in a perceptual space of color appearance can be analyzed, and making an analytic comparison between a physical system in the three-dimensional Euclidean color space and the perceptual system by means of a linear transformation therebetween.

24 Claims, 7 Drawing Sheets

Sample errors in Munsell chip locations

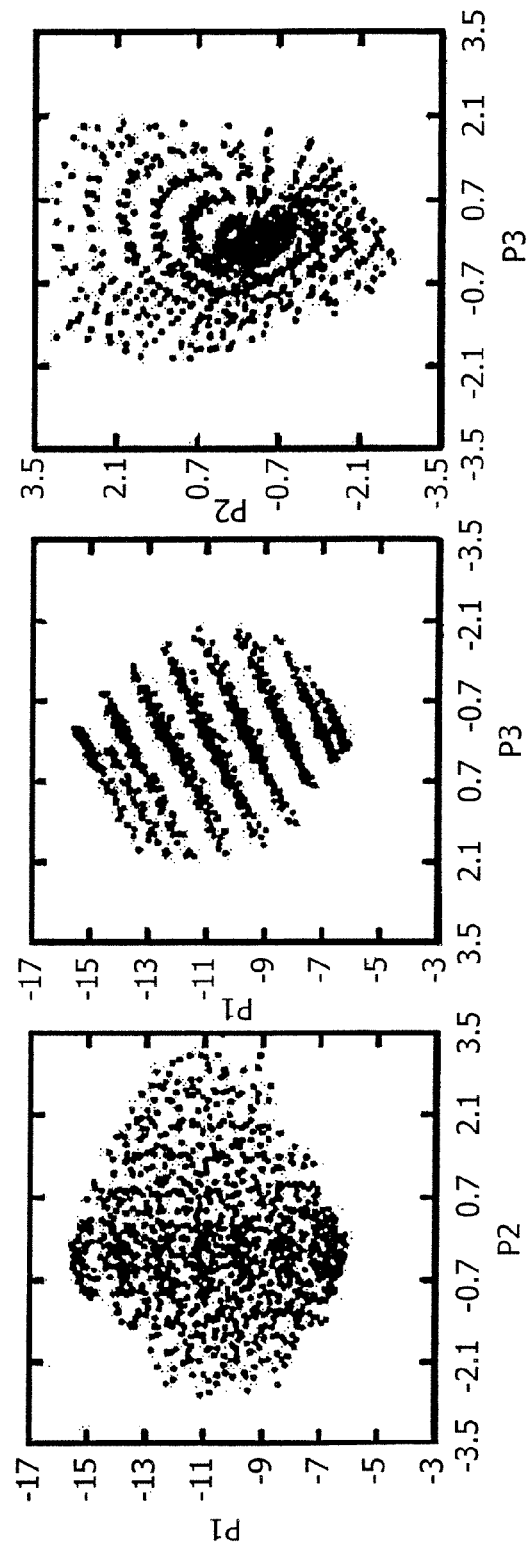

METHOD AND APPARATUS FOR USE OF AN UNIVERSAL COLOR INDEX (UCI): A COLOR APPEARANCE SYSTEM CALIBRATED TO REFLECTANCE SPECTRA

RELATED APPLICATIONS

The present application is related to U.S. Provisional Patent Application Ser. No. 60/915,533, filed on May 2, 2007, which is incorporated herein by reference and to which priority is claimed pursuant to 35 USC 119.

BACKGROUND OF THE INVENTION

1. Field of the Invention

The invention relates to the field of the measurement and analysis of color physically characterized in Euclidean space derived from reflectance spectra and in particular to an apparatus and process for transformation and correlation of the same to any perceptual space of color appearance defined in terms of human perception of colors and represented in a space.

2. Description of the Prior Art

There are two major color atlases of color samples that span the perceptual color space and are approximations of equally spaced perceptual differences based on extensive human color judgments: The Munsell [G. Wyszecki and W. S. Stiles, *Color Science: Concepts and Methods, Quantitative Data and Formulae,* 2nd ed. (Wiley, 1982); and Munsell Color Company, Inc., *Munsell Book of Color. Matte Finish Collection* (Munsell, 1976).] and the Optical Society of America Uniform Color Scales (OSA-UCS) [G. Wyszecki and W. S. Stiles, *Color Science: Concepts and Methods, Quantitative Data and Formulae,* 2nd ed. (Wiley, 1982)]. The two systems are based on different theoretical models, but share the characteristic of being embedded in three dimensional Euclidean space. The procedures and apparatus described in this disclosure apply equally well to both systems, however, we describe the system using the Munsell system, since it is better known and more commonly used in the trade. The Munsell color system was first patented in 1906 in U.S. Pat. No. 824,374. The Munsell system is illustrated in FIGS. 1 and 2. The Euclidean coordinate system representing the sample chips in the Munsell atlas are illustrated in FIG. 1 and has been widely used.

Most methods use color matching functions to transform reflectance spectra (after multiplying by some illuminate such as D65) into CIE color spaces which was first introduced beginning in 1931 and has been revised up to the current CIE L*a*b* standard in 1976. In effect this definition confounds the reflectance spectrum of a sample with the illuminate and an assumed observer from which the color matching functions were obtained. This results in troublesome nonlinear effects and perceptual similarities that differ in different parts of the space. Solutions were not arrived at analytically but were estimated and applied as look-up-tables. Previous solutions like L*a*b* were based on color matching function using monochromatic light over at least a range from 400 nm to 700 nm. The currently accepted international color standard is the CIE L*a*b* color specification. In the CIE system one calculates a color location in the chromaticity space by first summing the product of the reflectance spectra (times an illuminant) by the Color Matching Functions of a "Standard Observer". Complex computations are them made to place the location of the sample in a CIE L*a*b* chromaticity space consisting of the three coordinates L*, a*, and b*.

Before we describe the proposed process we need to note that there has long been an unsolved puzzle in colorimetry. On the one hand, the only objective and invariant measure of a color surface has to be based on the reflectance spectrum. The relations among reflectance spectra in physical space may be represented in a large variety of ways, conical, hyperbolic, Riemannian, Euclidean, etc. On the other hand there exist two color appearance models based on human perceptions and derived from judged similarities among color samples, namely the Munsell color system and the Optical Society of America's Uniform Color System (OSA-UCS). The puzzle is to find how the physical structure is related to the perceptual structure.

BRIEF SUMMARY OF THE INVENTION

The illustrated embodiment of the invention uses reflectance spectra of surfaces over a range of 400 nm to 700 nm. It must be expressly understood that the spectral range can be modified from that illustrated without departing from the spirit and scope of the invention. Conventional practice applies a nonlinear transformation (frequently a cube root) at the end of complex calculations, while in contrast we apply the cube root transformation at the beginning which greatly simplifies calculations. The manner in which L*a*b* defines color space confounds the reflectance spectra, the illumination, and an assumed observer. The proposed system defines the color of the samples in an atlas entirely in terms of the reflectance spectra. Illumination and observer effects are not relevant for the definition of the color of a surface; the reflectance spectrum defines any ordinary surface uniquely. This is in accord with the viewpoint of Billmeyer and Saltzman, *Principles of Color Technology* 2nd ed (Wiley, 1981), pp. 141-142, which states that two color samples comprise an invariant match when they have identical reflectance spectra and that such invariant matches look alike to all observers under all light sources.

The illustrated embodiment of the invention includes a process that specifies an appropriate preprocessing nonlinear transformation on the raw reflectance spectra that allows us to show an analytic relationship between the physical and perceptual systems defined in terms of a simple linear transformation.

The process begins with a demonstration that the physical reflectance spectra of colored surfaces are well fit in three-dimensional Euclidean space. This means that the reflectance spectra may be reconstructed by an appropriate linear combination of basis functions defined below.

The illustrated embodiment includes a system for the precise specification of color appearance from the reflectance spectra of the sample (Munsell color space in our illustrated example but generalizable to other color appearance systems). In addition to specifying the color appearance in the Munsell color system, the process may be used to calculate the results of mixing of any set of colors defined as locations in the color appearance space or in terms of their reflectance spectra and predict the location in the color appearance system or in the space of the reflectance spectra. The calculations back and forth among the reflectance spectra, their representation in Euclidean space, and the locations of color in Munsell color space are all linear transformations comprised of analytic solutions and involve no estimates or look-up tables (LUT). The solutions provided by the disclosed process are more precise specifications of the color of ordinary painted and printed surfaces than currently available. The results are important for setting standards for the specification of color surfaces and to the mixing and matching of paints, inks, and other colorants.

One example of an application is the calculation of the gamut of color possibilities of the mixture of a set of inks or paints. The specification of color part includes an improvement on the current international standard set by Commission International de l'Eclairage (CIE) in the L*a*b* system which confounds reflectance spectra with illuminants and observers. In the sample of 1269 Munsell color chips we use for illustration, the CIE L*a*b* systems fail to account for about 2% of the total data, a large error compared to the precision of human color discrimination abilities.

The disclosed process is the first method to calculate the transition from the location as defined by reflectance spectra to the perceptual location in a color appearance system, and the reverse, with analytic formulas that maintain mathematical accuracy. The process simplifies the process many times over and gains in precision. We have criteria of precision that allows us to compare our process with the International CIE standard and show a great increase in precision.

Another application includes use as a legal description of a trademark color used in corporate marks or logos. More importantly it could be used to aid in finding a precise match for a color for color reproduction work. We illustrate below how the best technology missed their intended specifications in the production of the Munsell Color Atlas (See FIG. 7). The illustrated embodiment of the invention also simplifies calculation of mixtures of colors as in printing and painting.

These examples in no sense even begin to exhaust or suggest the variety and scope of possible application of the invention, which can find utility in any application now known or later devised where color is an element.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 5A-5C are graphs which illustrate the location of the Munsell color chips represented in Euclidean space.

Figures 1A, 1B, 1C:
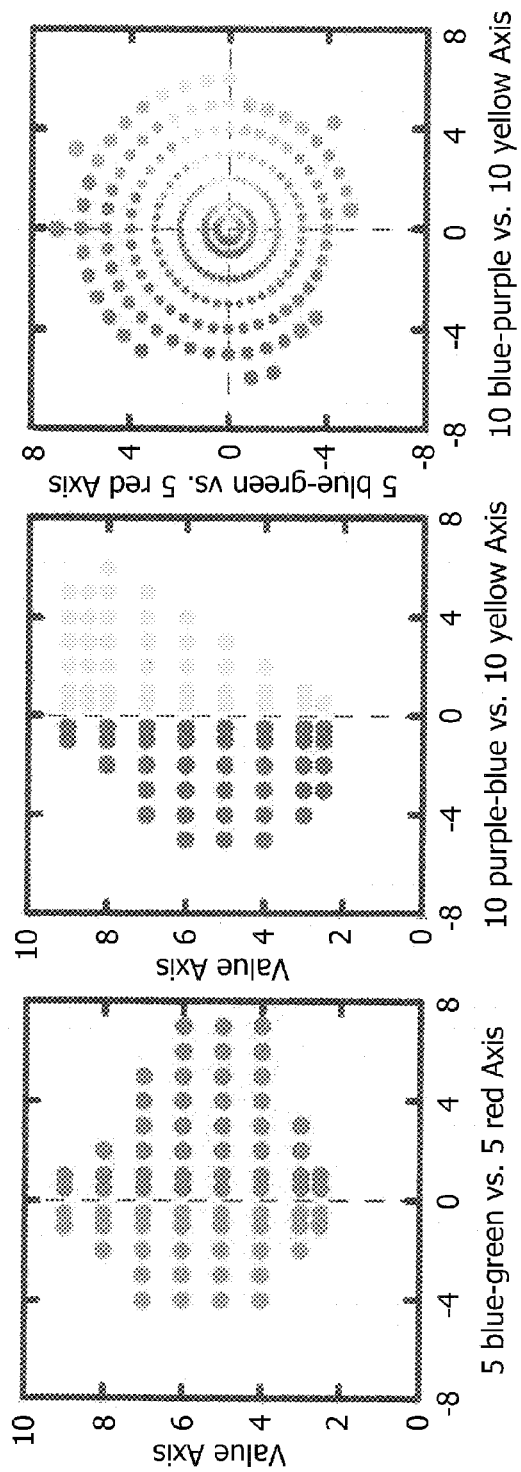
FIGS. 1A-1C are color charts which illustrate the prior art conceptual Munsell color system with arbitrary color coding meant to convey hue locations in approximate fashion.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The illustrated embodiment of the invention presents the results of an analysis of transformed reflectance spectra of the set of Munsell color chips in the atlas. We find that the reflectance spectra are well represented as a linear combination of three basis functions. The quantities that specify the contributions of each basis function to the composition of the reflectance spectra define a three-dimensional coordinate system in Euclidean space. The distances in this space represent Euclidean differences among the reflectance spectra. One object of the invention is to establish the relationship between the physical structure of spectra as defined in the Euclidean space and a perceptual space of color appearance defined in terms of how humans perceive colors.

We use the perception-based Munsell color appearance system as the model of how humans perceive color. It is to be expressly understood that the Munsell color appearance system could be replaced by other models, such as the Optical Society of America-Uniform Color Scales (OSA-UCS), of how humans perceive color, without departing from the spirit and scope of the invention. According the illustrated embodiment of the invention the Munsell perceptual system is related to the physical Euclidean model by mathematically defined linear transformations. Both spaces have desirable properties that include combining by the rules of convex combinations, described below. Calculations using convex combinations provide solutions to problems involving mixing and matching of reflectance spectra or color samples. Because the two spaces are linked by linear transformations, any solution found in either space apply equally well in both spaces.

We begin with the assumption that the color appearance of objects originates in their reflectance spectra that, together with the illumination source, determine the light stimuli reaching the photoreceptors. In the illustrated embodiment of the invention we focus attention on a highly constrained context, namely, the perception of the color of a single color sample observed on a neutral background in normal daylight. This constrained context is free of complex context effects, color contrast, color induction, and other complicating phenomena. In any given application the effect of such phenomena on the data can be corrected, compensated or adjusted by optical or data reduction means well known to the art to reduce the data to the constrained context.

The physical information about a color sample in such a constrained context resides in the measured reflectance spectra. Reflectance spectra are typically obtained by illuminating the sample with a standard spectrally flat light, which has approximately equal energy at all wavelengths, and measuring the percent of light reflected from the sample at each wavelength. We assume that two samples with identical reflectance spectra will appear the same when judged by humans in the constrained context.

We stress that the model is a mathematical simplification that does not reflect how biological organisms actually compute color appearance. However, it provides useful formulas to obtain predicted outcomes of simple color mixing and matching experiments.

We begin with a description of perceptual color appearance space. In this illustrated embodiment of the invention we use the three-dimensional Munsell system designed to present an arrangement of the full sample of colors in equal perceptual intervals. Perfected in studies spanning over 100 years, it represents a reasonable and well known description of the structure of human color perception.

We then analyze the physical structure obtained from the cube root of the reflectance spectra. The rationale of the cube root transformation is discussed below. We find that the reflectance spectra can be reconstructed to a very close tolerance by a linear combination of three basis functions, i.e., they may be closely approximated by combining just three curves in appropriate amounts. The weights for combining the basis functions constitute the coordinates in a three-dimensional Euclidean space that describe the similarities and differences among the reflectance spectra in metric terms and the chips they represent. Note that this physical representation is obtained from the color chips by objective measures with no input of human judgments whatsoever.

We next investigate the way in which the Euclidean differences among reflectance spectra are related to the perceptual differences among colors in Munsell space. The Munsell perceptual system is related to the physical Euclidean model by two mathematically defined linear transformations, one from the perceptual-to-the-physical and one from the physical-to-the-perceptual.

The illustrated embodiment of the invention built on the idea that three dimensional Euclidean coordinates derived from transformed (cube root) reflectance spectra of Munsell color chips are remarkably similar to the CIE L*a*b* coordinates computed on the same data before transformation. The CIE L*a*b* chromaticity system is the internationally recognized color standard based on the concept of an ideal observer whose characteristics are derived from extensive human color-matching experiments.

The similarity of the results obtained with radically different methods, one depending upon human based color matching experiments, the other depending solely upon physical measurements of transformed reflectance spectra, suggests that the transformed reflectance spectra reflect relations among colors precisely as or at least very much like humans see them.

Turn now and consider the Munsell perceptual color system in more detail. The Munsell system is a perception-based three-dimensional system designed to present an arrangement of the full sample of colors in equal perceptual intervals. Based on millions of human judgments, the Optical Society of America estimated the best-fitting CIE colorimetric positions for each of the Munsell color chips so that the entire set would conform as closely as possible to the Munsell conceptual system. Independent studies confirm the approximately equal perceptual spacing of the color chips and the overall organization of the system.

In the illustrated embodiment of the invention we assume the conceptual Munsell color system is an adequate model for the normal human perceptual system. We also make the important assumption that the Munsell color atlas was an attempt to produce chips in perfect accordance with the conceptual system. As discussed below we find that this attempt failed by a small margin. In the Munsell system each color is described in terms of three attributes: hue, value, and chroma. The full set of color chips in the Munsell system may be represented as a somewhat irregular sphere as shown in three orthogonal sectional views in FIG. 1 A-C. The colors in the plot are mostly arbitrary but reflect major hue sectors named below, the actual colors ranging from black to white on the vertical value (lightness) axis and from achromatic to higher chroma (saturation) as color chips depart further from the achromatic locus of the circles. Viewed from above as in FIG. 1C, the various hues are seen as 40 spokes radiating out from the achromatic central axis. The circles of increasing size represent increasing values of chroma (samples with equal chroma levels but differing in value are stacked on top of each other in FIG. 1C and could be viewed as cylinders). There are 10 equally spaced hue sectors labeled red, red-purple, purple, purple-blue, blue, blue-green, green, green-yellow, yellow, and yellow-red. The four spokes in each sector represent finer hue gradations, called areas in the Munsell system, labeled 2.5, 5, 7.5, and 10. Area 5 usually represents the most representative hue.

FIG. 1A shows a full plot of the two pages of the Munsell color system that constitute the spokes of the 5 red versus 5 green-blue axis, while FIG. 1B shows those of the 10 yellow versus 10 blue-purple axis. The central axis of value in FIGS. 1A-1B is achromatic and runs in equal perceptual steps from black (bottom) to white (top). Details of the derivation of the coordinate system used here may be found in R. G. D'Andrade and A. K. Romney, "A quantitative model for transforming reflectance spectra into the Munsell color space using cone sensitivity functions and opponent process weights," Proc. Natl. Acad. Sci. USA 100, 6281-6286 (2003).

Figure 2:
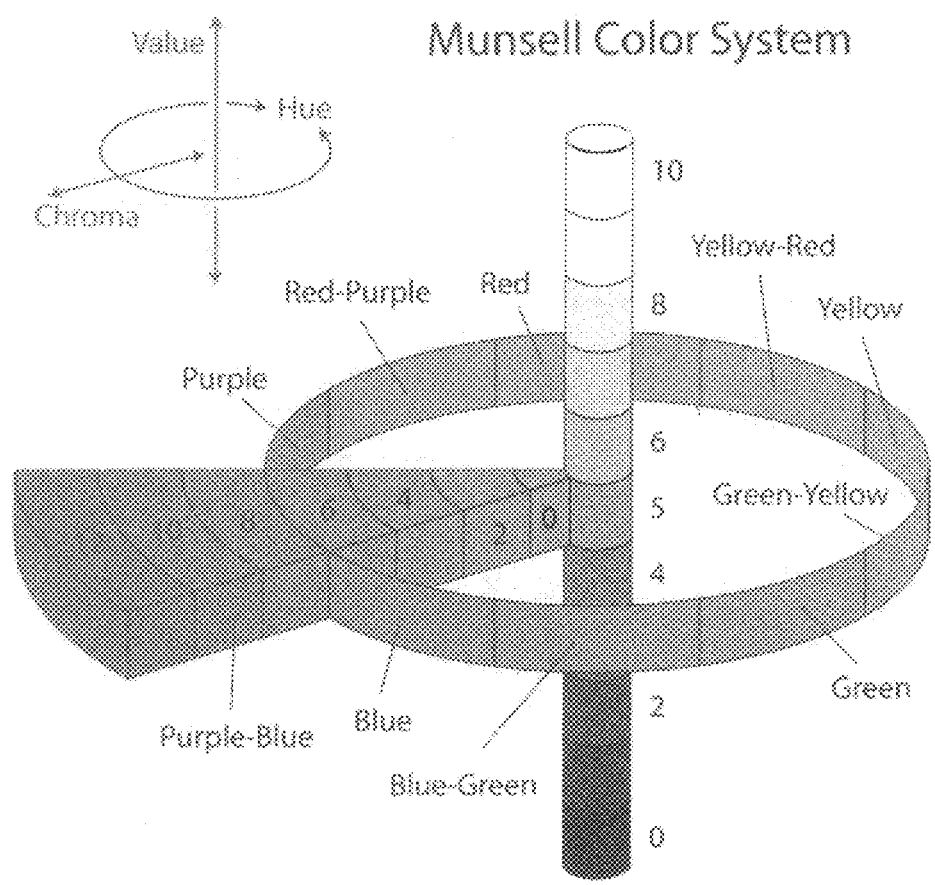
FIG. 2 is a simplified three dimensional graphic illustration of the prior art Munsell color system, showing: a circle of hues at value 5 chroma 6; the neutral values from 0 to 10; and the chromas of purple-blue (5PB) at value 5.

A simplified graphic representation of the Munsell color system is shown in FIG. 2. As stated above the Munsell system consists of three independent dimensions which can be represented cylindrically in three dimensions as an irregular color solid: hue, measured by degrees around horizontal circles; chroma, measured radially outward from the neutral (gray) vertical axis; and value, measured vertically from 0 (black) to 10 (white). In each dimension, Munsell colors are as close to perceptually uniform as Munsell could empirically make them, which makes the resulting shape quite irregular. Each horizontal circle Munsell divided into five principal hues: Red, Yellow, Green, Blue, and Purple, along with 5 intermediate hues halfway between adjacent principal hues. Each of these 10 steps is then broken into 10 sub-steps, so that 100 hues are given integer values. Two colors of equal value and chroma, on opposite sides of a hue circle, are complementary colors, and mix additively to the neutral gray of the same value.

Value, or lightness, varies vertically along the color solid, from black (value 0) at the bottom, to white (value 10) at the top. Neutral grays lie along the vertical axis between black and white.

Chroma, measured radially from the center of each slice, represents the "purity" of a color, with lower chroma being less pure (more washed out, as in pastels). Note that there is no intrinsic upper limit to chroma. Different areas of the color space have different maximal chroma coordinates. For instance light yellow colors have considerably more potential chroma than light purples, due to the nature of the eye and the physics of color stimuli. This led to a wide range of possible chroma levels—up to the high 30s for some hue—value combinations (though it is difficult or impossible to make physical objects in colors of such high chromas, and they cannot be reproduced on current computer displays).

A color is fully specified by listing the three numbers for hue, value, and chroma. For instance, a fairly saturated purple of medium lightness would be 5P 5/10 with 5P meaning the color in the middle of the purple hue band, 5/meaning medium lightness, and a chroma of 10.

Turn now to consider the task of characterizing the structural properties of the reflectance spectra. There are some important reasons for the careful study of reflectance spectra of objects in general and of the Munsell color chips in particular. First, in natural situations most information about the color appearance of objects is contained in the light reflected from the surfaces of those objects, i.e., the reflectance spectra plus the illuminant. Second, the evolution of color vision probably involved adaptations to detect differences among the patterns of reflectance spectra of objects in natural scenes. Third, the 1269 reflectance spectra of color chips in the Munsell color atlas are a sample from a known perceptual arrangement of a very wide range of realizable surface colors. Finally, information derived from reflectance spectra complement the data obtained with narrow band lights used in the majority of color experiments.

The reflectance spectra analyzed in the illustrated embodiment of the invention derive from 1,269 spectra of the 1976 matte edition of the Munsell color atlas. The spectra were obtained from a Perkin-Elmer lambda 9 UV/VIS/NIR spectrophotometer measured from 380 nm to 800 nm at 1 nm resolution using an integrative sphere. The data were downloaded from the web site: http://www.it.lut.fi/research/color/database/database.html. We designate the original downloaded data as a matrix, $A_{1269 \times 421}$.

Color vision research is usually based on a range of the reflectance spectra from about 400 nm to 700 nm.

It has been long established that a non-linear transformation is necessary to transform reflectance spectra into a reasonable approximation of a perceptual color system. The international color standard CIE L*a*b* uses the cube root transformation and our findings in previous research provide additional evidence that the cube root is the appropriate transformation for modeling perceptual color space.

Figure 3:
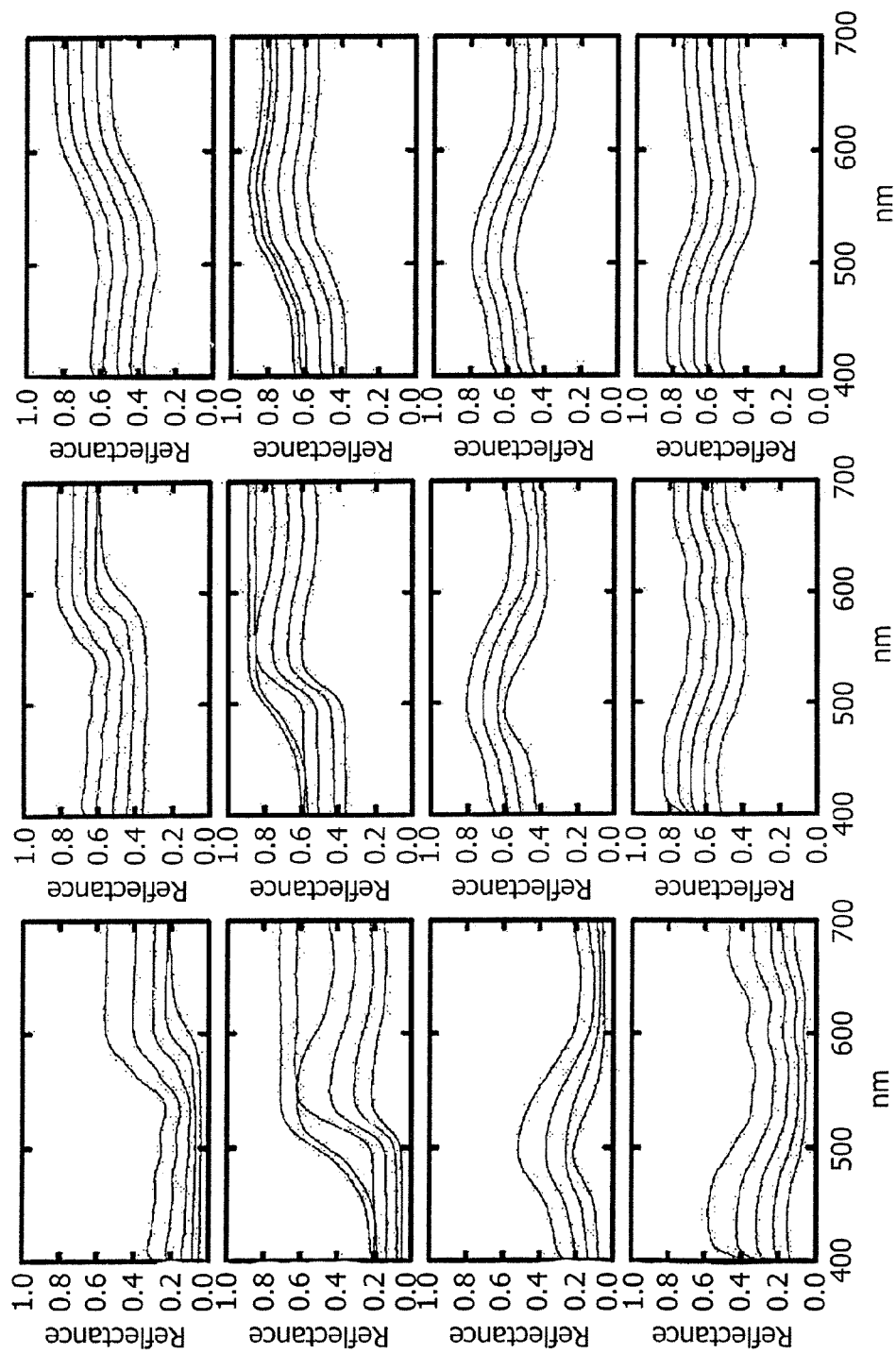
FIG. 3 is a series of sample illustrations of reflectance spectra of all varying value or lightness that occur at chroma level 6 of four equally spaced Munsell hues, untransformed spectra shown in the left column, cube root transformations shown in the middle column, and reconstructed reflectance spectra of the ideal conceptual Munsell chips shown in the right column of the figure.

In the illustrated embodiment of the invention we apply the cube root transformation to the reflectance spectra prior to further analysis. The effect of this transformation is illustrated in FIG. 3, where untransformed spectra are shown in the left column, spectra transformed by taking the cube root at are shown in the middle column, and ideal spectra derived from Munsell coordinates, described below, in the right column. The four rows of FIG. 3 represent samples from the four Munsell hues that form the orthogonal axes of FIG. 1. The spectra contain all values of lightness of chips of chroma 6. Thus all the spectra in a single panel or vertical column in FIG. 3 differ only in lightness. Note that the untransformed spectra in each panel have noticeable differences in the shape and spacing of the curves. For the cube root spectra the shapes of the curves are of the same general shape and nearly equally spaced. We interpret the small observed deviations from perfect equality in spacing and shape as being errors involved in the production of the chips. The reflectance spectra in FIG. 3 are representative of surfaces in general in that they are very broad band and relatively smooth curves that reflect at least some light at all wavelengths. This is true not only of the painted surfaces such as Munsell chips but also of natural objects.

We turn now to the task of representing the reflectance spectra in Euclidean space. Based on the discussion above we take a cube root element by element of the original matrix. Each element of the matrix represents the spectral value in 1 nm increments across the sampled spectral range. Our final set of data for analysis consists of the cube root version of the original matrix, $A_{1269 \times 421}$, reduced to the 400 nm to 700 nm range $$S_{1269 \times 301} = \sqrt[3]{A_{1269 \times 301}}. \tag{1}$$

All the results reported in this illustrated embodiment of the invention derive from the analysis of the matrix $S_{1269 \times 301}$. It is known that a singular value decomposition of a matrix such as $S_{1269 \times 301}$ can be expressed as:

$$S_{N \times M} = U \Delta V^T, N \geq M \geq K, U_{N \times K} = (\mu_{ik}), V_{M \times K} = (v_{jk}),$$
$$k = 1, 2, \ldots, K, \tag{2}$$

Where $\Delta$ is a diagonal matrix consisting of singular values $d_k$ and K=3 provides an adequate approximation (it accounts for all but 0.02 percent of the total variance in the data) between the two sides of Eq. (2), resulting in a three-dimensional Euclidean representation. We can write:

$$\hat{S}_{1269 \times 301} = U_{1269 \times 3} \Delta_{3 \times 3} V_{3 \times 301}^T. \tag{3}$$

Figure 4:
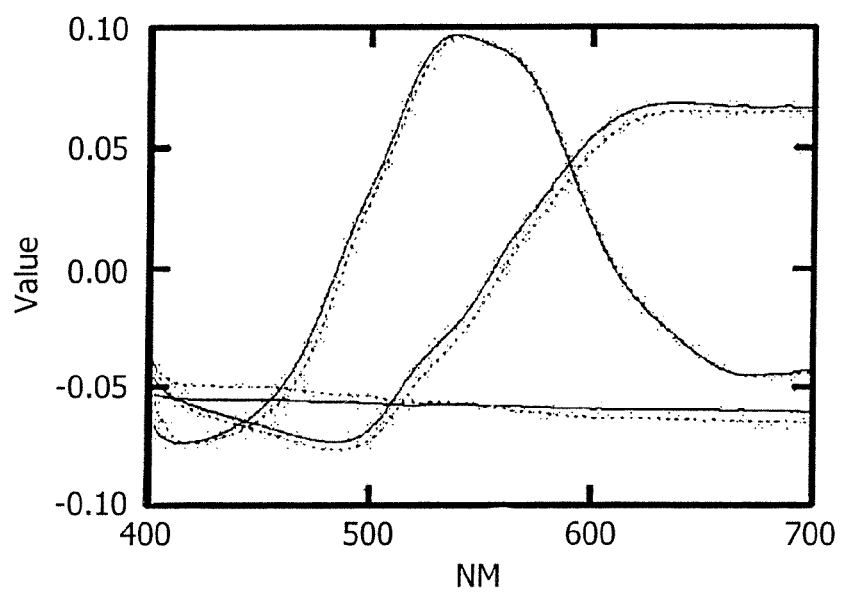
FIG. 4 is a graph of the three basis functions computed from the Munsell reflectance spectra after cube root transformation shown with solid lines compared to the basis function derived from the original reflectance spectra shown with dotted lines.

The U matrix (when multiplied by the $\Delta$ matrix) contains the three dimensional Euclidean coordinates for each of the 1269 color chips in the physically defined reflectance spectra space. The V matrix contains the basis function illustrated in FIG. 4 with solid lines. The shape of these basis functions derives from the singular valued decomposition (SVD) of the data. They represent the optimal shapes, that when combined with proper weights, which best reconstructs the reflectance spectra of all 1269 chips. That is, all the individual spectra may be reconstituted by adding the proper amount of each of these three basis functions. These basis function are general and apply to virtually all painted or colored surfaces. We have analyzed the OSA-UCS reflectance spectra and the same basis functions emerge. Thus their use may be generalized to specify the color of any ordinary surface in the Munsell space, e.g., any painted surface whatsoever or any plant material like a leaf or flower.

The first basis function is close to a flat line or constant and represents the mean of the spectra and in perceptual terms roughly approximates Munsell V (value) or lightness. All of the chromaticity information is contained in the second and third basis functions and accounts for differences in Munsell H (hue) and C (chroma or saturation).

We next examine in detail the location in Euclidean space of the 1269 Munsell colors represented by the spectra. The locations may be estimated by weighting the row singular vectors by the singular values from Eq. 3 as follows:

$$P_{1269 \times 3} = \{p_1, p_2, p_3\} U_{1269 \times 3} \cdot \Delta_{3 \times 3}. \tag{4}$$

These three vectors represent the contribution of each basis function to the estimation of any given spectrum. The $p_i$ for any given spectrum may be estimated with multiple regression techniques using the basis functions to predict the novel spectrum. The obtained coefficients are mathematically identical to those obtained by Eq. (4).

The results showing the locations of the 1269 Munsell chip reflectance spectra are plotted in FIG. 5A-5C. The various value planes visible in FIGS. 5A-5B, planes $p_1, p_2$ and $p_1, p_3$ respectively, are sloped rather than horizontal as in the conceptual Munsell representation in FIGS. 1A-1C. FIG. 5C shows a plot of the second and third basis functions, $p_2, p_3$, that has an overall qualitative similarity to the Munsell color system although it is not exactly centered on the zero point of the axes nor is it oriented the same. It is important to note that these coordinates specify the amount that each basis function contributes to the reconstruction of the original spectra. The shape of any empirical spectrum is closely approximated by combining the basis functions weighted by their P coordinate scores.

We now consider the transformation between the physical space based on reflectance spectra and Munsell ideal perceptual systems. The final task of the illustrated embodiment of the invention is to compute the relationship between the structure derived from an analysis of the reflectance spectra and the conceptual Munsell structure. Our approach is to compute the linear transformation of the Munsell conceptual coordinates that best predicts the coordinates of the Euclidean model, namely, $P_{1269\times 3}$ from Eq. [4]. We denote the Munsell conceptual coordinates as a matrix, $M_{1269\times 3} = \{m_1, m_2, m_3\}$ where $m_1$=Munsell value, $m_2$=5 red versus 5 green-blue Munsell axis, and $m_3$=10 yellow versus 10 blue-purple Munsell axis. We obtain estimates of the Euclidean coordinates by standard regression techniques and get estimates as follows:

$$\hat{p}_1^m = -2.8204 + (-1.3423 * m_1) + (-0.1484 * m_2) + (0.2831 * m_3) \quad (5)$$

$$\hat{p}_2^m = -0.0065 + (-0.0256 * m_1) + (0.4789 * m_2) + (0.2688 m_3) \quad (6)$$

$$\hat{p}_3^m = -0.2028 + (0.0395 * m_1) + (-0.1723 * m_2) + (0.2809 * m_3) \quad (7)$$

We substitute the estimated values of $\hat{p}_i^m$ for those of $p_i$ in Eq. [4] and then use Eq. [3] to obtain estimates of the reflectance spectra of ideal conceptual Munsell samples.

These estimates are obtained by the following equation:

$$\hat{S}_{1269\times 301}^M = \hat{P}_{1269\times 3}^M V_{3\times 301}^T \quad (8)$$

In FIG. 3 we plot the reconstructed reflectance spectra in the right column for comparison to the empirically measured spectra. It may be seen that the spectra corresponding to the ideal conceptual Munsell chips in each panel are of the same shape and are equally spaced between the various value levels (except for the Yellow panel which contains an intermediate V level of 8.5.).

We now pose the question of where the empirical coordinates, $P_{1269\times 3}$, would be located in Munsell space. Since we know that the estimated $\hat{P}_{1269\times 3}^M$ matrix is a linear transformation of the Munsell coordinates, we can compute a linear transformation back to the Munsell coordinates as follows:

$$m_1 = -1.9401 + (-0.7304 * \hat{p}_1^m) + (0.0235 * \hat{p}_2^m) + (0.7031 * \hat{p}_3^m) \quad (9)$$

$$m_2 = -0.4825 + (-0.0719 * \hat{p}_1^m) + (1.5681 * \hat{p}_2^m) + (-1.4040 * \hat{p}_3^m) \quad (10)$$

$$m_3 = 0.6990 + (0.0583 * \hat{p}_1^m) + (0.9286 * \hat{p}_2^m) + (2.5996 * \hat{p}_3^m) \quad (11)$$

Figures 6A, 6B, 6C:
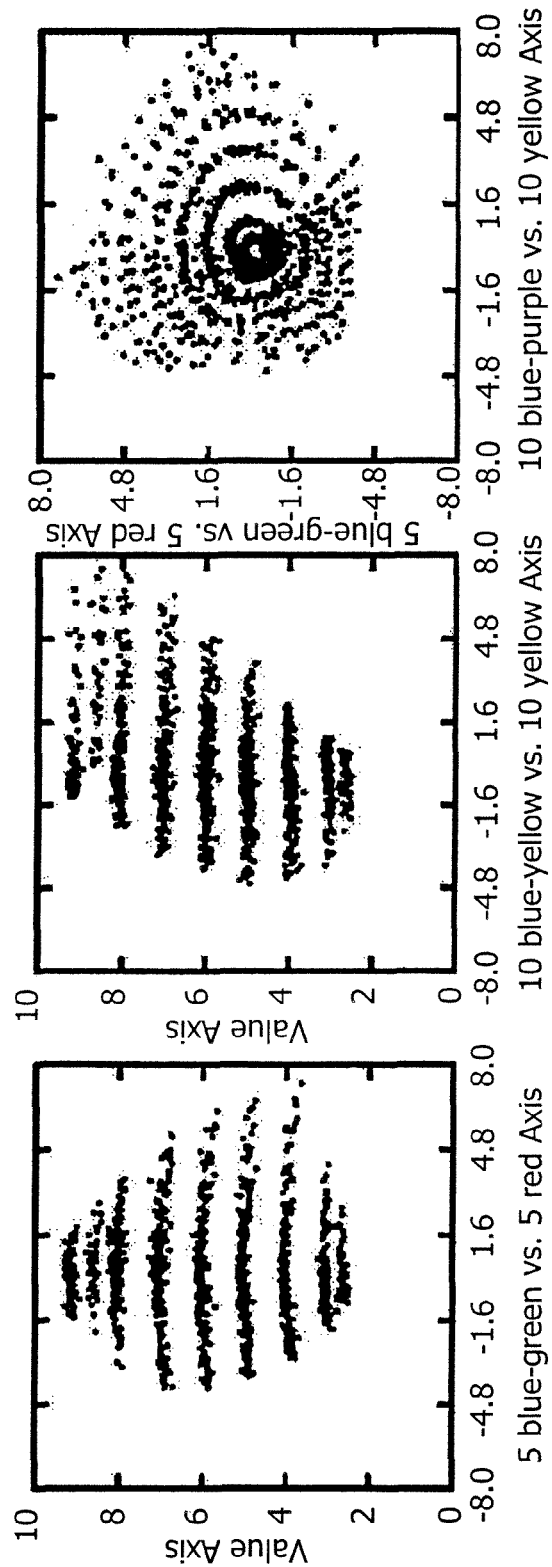
FIG. 6 is a plot showing the location of the Munsell color chips after a linear transformation from the Euclidean system to the Munsell coordinate system.

Eqs. [11-13] apply not only to the hypothetical spectra generated by the ideal conceptual Munsell locations, but to all possible locations obtained from spectra generated from the three basis functions. For example, to compute the location of the empirically measured chips in Munsell space we can substitute $p_i$'s for the $\hat{p}_i^m$'s in Eqs. [11-13]. FIG. 6 shows the results of the linear transformation of the Euclidean model into the Munsell coordinate system.

We view the differences between the locations of the empirical chips in FIG. 6 from those of the ideal Munsell locations in FIG. 1 as errors in production of the measured Munsell color chips. At the time of the main psychophysical research resulting in the Optical Society of America's research on the Munsell renotation system there was no precise way to determine the exact perceptual character of a chip other than iterated judgments. Since only chips similar to each other were compared, errors tended to be correlated. Given the circumstances of the production of the Munsell color chips, the plots of FIGS. 1 and 6 achieved a remarkably close fit. To give an idea of the size and nature of the errors made, we plot in FIG. 7 the location of the spectra shown in FIG. 3 together with four additional intermediate hues. The location of the empirical spectra from the middle column is plotted as circles and the reconstructed conceptual spectra from the right column are plotted as squares. Note that chips of a given hue tend to be clustered and (except for Yellow) any outlier tends to be low in value (colors closest to black are indicated by largest circles), i.e., as may be seen in the fact that the largest circles are furthest from the center of the cluster. One of the advantages of the method presented here is that the direction and size of any error is immediately apparent for which adjustment can then be made. The disclosed method makes it possible to produce a more precise atlas than currently available.

The Munsell Atlas was designed to provide color samples representing the theoretically defined locations in this space. At the time of the production of the atlas no system existed to specify exactly how to paint (samples in the atlas were painted) the samples to match a given theoretically defined location that constituted the aiming point. For this reason the location of the atlas samples are only approximations of their labeled or alleged location in Munsell space.

Figure 7:
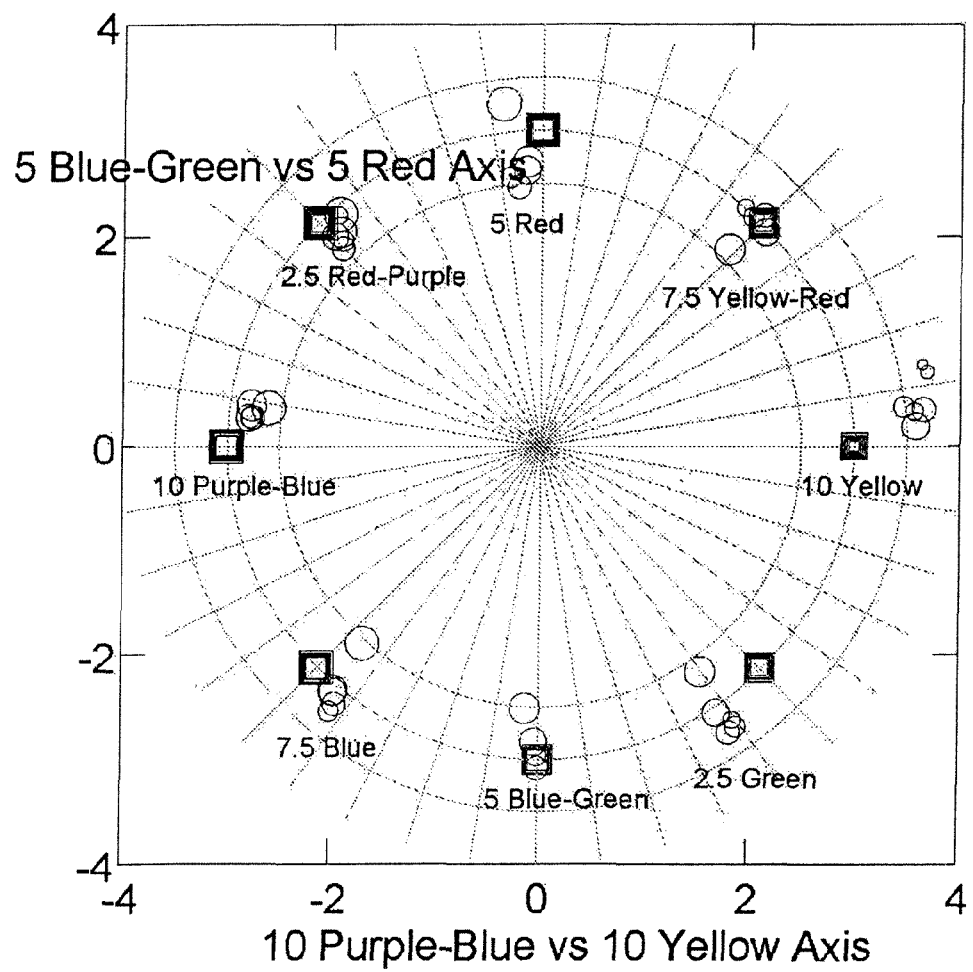
FIG. 7 is a plot showing a comparison of the locations of selected empirical Munsell chips with their conceptual locations. The chips are eight equally spaces hues beginning at 5 Red, all of chroma 6 with all degrees of value or lightness. The empirical chip location of a color atlas are plotted with circles while the conceptual locations or Munsell aiming points are plotted as squares with the size of the symbols (circles) inversely related to value, namely the largest circles are closest to black and the smallest closest to white. The radial grid lines are 40 conceptual hues. The circular grid lines are the chroma levels of 5, 6 and 7.

There is a cautionary message in FIG. 7 for psychophysics using Munsell chips in color perception experiments. The assumption that the Munsell chips are located in their ideal conceptual locations, leads to errors of a magnitude equivalent to the chip production errors illustrated in FIG. 7. The errors indicate that the standard Munsell chips are not adequate for carefully controlled psychophysical experiments, since the errors are large compared to the color discrimination ability in humans.

An important implication of the linkage between the physical Euclidean space of reflectance spectra and the perceptual space of Munsell color by linear transformations is that solutions computed by convex combinations in either space apply equally well in both spaces. The notion of convex sets has recently been applied in the art to the solution of two color problems, namely reducing the number of calibration charts and finding metamer sets without spectral calibration. The basic idea arises from the observation that reflectance spectra space and RGB space are closed and convex and hence the extreme points in the data specify a convex hull that encloses the whole target. We propose to apply similar notions to enhance the usefulness of the model presented above. We proceed by generating all possible combinations of the three basis functions illustrated in FIG. 3 to construct a convex set of all reflectance spectra in the range from 400 nm to 700 nm that occur in the interval 0 to 1 to constitute a vector space defined as X and $x_i \in X$. Within this set any combination of elements from X follows the rules of convex combination and is defined as a linear combination of the form:

$$\alpha_1 x_1 + \alpha_2 x_2 + \ldots + \alpha_n x_n, \quad (12)$$

where each $x_i \in X$, each $\alpha_i \geq 0$, and the $\alpha_i$ sum to 1.

Any proper subset of vectors that form a convex hull in the vector space of X also follow the rule of convex combinations. The Munsell sample, $S_{1269\times 301}$, and its complement, $1-S_{1269\times 301}$, computed element by element, are proper subsets of X. It follows that the rule of convex combinations is also valid in the space of $P_{1269\times 3}$ that specifies the weighting of the basis functions that form any specific reflectance spectrum. This space is embedded in a three-dimensional Euclidean space. An important implication of the linkage between the physical Euclidean space of reflectance spectra and the conceptual space of Munsell color by linear transformations is that solutions computed by convex combinations in either space apply equally well in both spaces. It is important to note that the eight paints used in the art to paint the Munsell chips constitute eight extreme points defining the convex hull of a convex set. Consequently, assuming the kind of stock used to produce the chips, the same paints, etc., the methods outlined in this disclosure could have been used to directly compute the appropriate combinations of paints to produce chips precisely located in Munsell conceptual space.

The Munsell conceptual space has some practical advantages in the way the hues are arranged. One example, previously mentioned, is that the combination of any color (or its reflectance spectra) and its complement form an achromatic color (or constant spectra). Complementary colors in Munsell space also predict afterimage effects.

The conclusions which can be drawn from the illustrated embodiment of the invention include: First, the cube rooted reflectance spectra of many surfaces including Munsell color chip are well characterized in three-dimensional Euclidean space. Second, appropriate linear transformations provide a perfect mapping between the Euclidean space of reflectance spectra and the Munsell perceptual space. Third, under proper constraints the three basis functions combine to describe a super set of realizable reflectance spectra that characterize colored surfaces including painted, organic, and other surfaces. Fourth, the rules of convex combinations apply to both the physical and perceptual spaces and the linear transformations allow results obtained in one space to be applied in the other.

It is understood that the conditions in which these conclusions are valid are constrained to viewing color samples in a neutral achromatic background of similar luminance in which the whole environment is illuminated by flat natural daylight. In this restricted situation we assume that the measured reflectance spectra of the sample contain the relevant information for color perception. Taking the cube root of the reflectance spectra has the effect of transforming nonlinear functions into linear functions in the formulation of mathematical models of reflectance spectra.

The methods for fitting idealized spectra to the Munsell color appearance system may be generalized to any well-defined color appearance system with defined Euclidean coordinates such as OSA-UCS (CIE L*a*b* is not such as system as it does not claim to be equally perceptually spaced). The reason we picked the Munsell system to illustrate our invention, in addition to its intuitive simplicity, is that it is the oldest and best established as well as the best researched system explicitly designed to reflect human perceptual color appearance.

The illustrated embodiment can be performed using a conventional spectrum analyzer coupled to and/or controlled by a processor or computer in which instructions are stored for controlling the spectrum analyzer, inputting its data, and/or processing the data according to the foregoing disclosure according to means well known in the art in light of the teachings of the illustrated embodiment of the invention. Thus, the embodiments of the invention include a process, an apparatus for performing the process with or without reflectance spectroscopy included as part of the apparatus, and computer software for use in such a process or apparatus.

A major puzzle remains, namely, to explain why the reflectance spectra are so well fitted in three-dimensional space. Historically the three dimensions of color were explained on the basis of human biology because humans have three types of photoreceptors. The present results indicate that color is seen as three dimensional because reflectance spectra between 400 nm and 700 nm reduce to three basis functions. The puzzle is why this basis reduction should exist. The only reasonable explanation we have found is by Maloney who suggests that it results from some physical constraint imposed on the dimensionality of reflectance spectra by molecular and quantum considerations.

In summary, Table 1 illustrates how the Munsell color atlas is converted into a three dimensional Euclidean color space specified in metric terms and compared to generate the results shown in FIG. 7, and also illustrates the conversion from Euclidean to Munsell space and vica versa.

TABLE 1

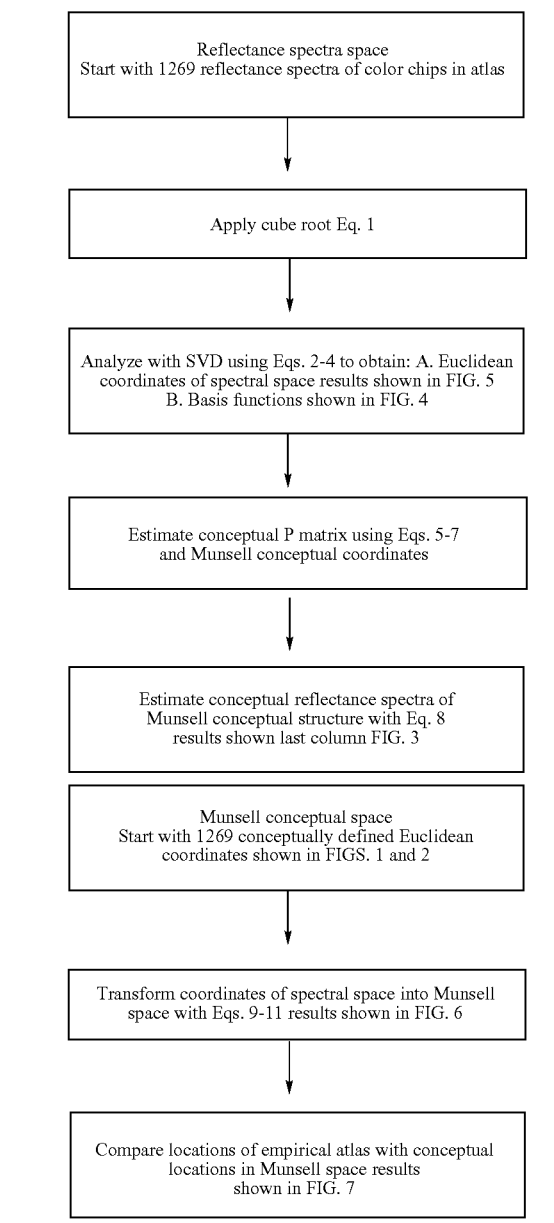

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A method for transforming a physically-based characterization of color defined in Euclidean space derived from reflectance spectra and a theoretically defined perceptual space of color appearance defined in Euclidean space in terms of equal perceptual spacing of human judgments of colors comprising:

obtaining a physical reflectance spectrum in a selected spectral range of a reflected color of an object;

generating a cube root reflectance spectrum of the physical reflectance spectrum;

reconstructing the cube root reflectance spectrum by a weighted linear combination of three basis functions, the weights of a linear combination of the basis functions constituting coordinates in a physical Euclidean color space with respect to which Euclidean color space similarities and differences between the physical reflectance spectra and a color characterized in the perceptual space of color appearance can be quantitatively analyzed; and linearly transforming a quantitative characterization of a target color between the physical Euclidean color space and the perceptual space of color appearance by which transformation the target color can be quantitatively compared.

2. The method of claim 1 where linearly transforming a quantitative characterization of a target color between the physical Euclidean color space and the perceptual space of color appearance comprises linearly transforming the quantitative characterization of a target color from the physical Euclidean color space to the perceptual space of color appearance.

3. The method of claim 1 where linearly transforming a quantitative characterization of a target color between the physical Euclidean color space and the perceptual space of color appearance comprises linearly transforming the quantitative characterization of a target color from the perceptual space of color appearance to the physical Euclidean color space.

4. The method of claim 1 where generating the cube root spectrum of the reflectance spectrum in the selected spectral range comprises generating a cube root spectrum of the physical reflectance spectrum in a reduced spectral range smaller than an average actual human spectral range of vision.

5. The method of claim 4 where generating a cube root spectrum of the physical reflectance spectrum in the reduced spectral range comprises obtaining the cube root spectrum of the physical reflectance spectrum within a spectral range of approximately 400 nm to 700 nm.

6. The method of claim 1 where linearly transforming the quantitative characterization of a target color comprises linearly transforming the quantitative characterization of the target color between coordinates in a three-dimensional Euclidean color space and coordinates in a Munsell system.

7. The method of claim 6 where linearly transforming the quantitative characterization of the target color between coordinates in a three-dimensional Euclidean color space and coordinates in a Munsell system comprises transforming the Munsell coordinates into the physical reflectance spectra space coordinates by means of a linear transformation using $$\hat{p}_1^m = -2.8204 + (-1.3423 * m_1) + (-0.1484 * m_2) + (0.2831 * m_3)$$

$$\hat{p}_2^m = -0.0065 + (-0.0256 * m_1) + (0.4789 * m_2) + (0.2688 m_3)$$

$$\hat{p}_3^m = -0.2028 + (0.0395 * m_1) + (-0.1723 * m_2) + (0.2809 * m_3).$$

8. The method of claim 6 where linearly transforming the quantitative characterization of the target color between coordinates in a three-dimensional Euclidean color space and coordinates in a Munsell system comprises transforming the physical reflectance spectra space coordinates into the Munsell coordinates by means of a linear transformation using $$m_1 = -1.9401 + (-0.7304 * \hat{p}_1^m) + (0.0235 * \hat{p}_2^m) + (0.7031 * \hat{p}_3^m)$$

$$m_2 = -0.4825 + (-0.0719 * \hat{p}_1^m) + (1.5681 * \hat{p}_2^m) + (-1.4040 * \hat{p}_3^m)$$

$$m_3 = 0.6990 + (0.0583 * \hat{p}_1^m) + (0.9286 * \hat{p}_2^m) + (2.5996 * \hat{p}_3^m).$$

9. The method of claim 1 where linearly transforming the quantitative characterization of a target color between the physical Euclidean color space and the perceptual space of color appearance comprises linearly transforming the quantitative characterization of a target color between coordinates in a three-dimensional Euclidean color space and coordinates in a Munsell or an OSA-UCS system.

10. The method of claim 1 further comprising reconstructing the cube root spectrum to generate a reconstructed spectrum of a superset of spectra comprised of all possible cube root reflectance spectra in a color atlas generated by linear combinations of the three basis functions.

11. The method of claim 10 further comprising reconstructing a cube root spectrum of a combination of two or more cube root spectra from the superset of spectra by convex combination.

12. The method of claim 1 further comprising precisely matching a target color for reproducing color work or determining mixtures of colors in printing and painting, which target color is characterized in the perceptual space of color appearance by performing the steps of obtaining a cube root spectrum of the physical reflectance spectrum in a selected spectral range of the target color, reconstructing the cube root of the physical reflectance spectrum by a weighted linear combination of three basis functions, and linearly transforming a quantitative characterization of a target color between a physical system in the three-dimensional Euclidean color space and the perceptual system.

13. An apparatus utilizing a physical structure of a spectrum as defined in the Euclidean color space and a perceptual space of color appearance defined in terms of human perception of colors comprising:
   a spectrum analyzer to measure a reflectance spectrum from an object in a selected spectral range;
   a processor coupled to the spectrum analyzer to process data to generate cube root spectrum of the reflectance spectrum in at least a portion of the selected spectral range, to reconstruct the cube root of the physical reflectance spectrum by a weighted linear combination of three basis functions, the weights of the linear combination of the basis functions constituting the coordinates in a three-dimensional Euclidean color space with respect to which similarities and differences among reflectance spectra in metric terms and a color characterized in a perceptual space of color appearance can be characterized, and linearly transforming a quantitative characterization of a target color between the physical Euclidean color space and the perceptual space of color appearance.

14. The apparatus of claim 13 where the analyzer measures the reflectance spectrum or the processor processes data in a reduced spectral range smaller than an average actual human spectral range of vision.

15. The apparatus of claim 14 where the reduced spectral range is within the spectral range of approximately 400 nm to 700 nm.

16. The apparatus of claim 13 where the processor makes an analytic comparison between coordinates in a three-dimensional Euclidean color space and coordinates in the Munsell system by means of a linear transformation therebetween.

17. The apparatus of claim 16 where the processor transforms Munsell coordinates into the physical reflectance spectra space coordinates by means of a linear transformation using $$\hat{p}_1{}^m = -2.8204 + (-1.3423 * m_1) + (-0.1484 * m_2) + (0.2831 * m_3)$$

$$\hat{p}_2{}^m = -0.0065 + (-0.0256 * m_1) + (0.4789 * m_2) + (0.2688 m_3)$$

$$\hat{p}_3{}^m = -0.2028 + (0.0395 * m_1) + (-0.1723 * m_2) + (0.2809 * m_3).$$

18. The apparatus of claim 16 where the processor transforms physical reflectance spectra space coordinates into the Munsell coordinates by means of a linear transformation using $$m_1 = -1.9401 + (-0.7304 * \hat{p}_1{}^m) + (0.0235 * \hat{p}_2{}^m) + (0.7031 * \hat{p}_3{}^m)$$

$$m_2 = -0.4825 + (-0.0719 * \hat{p}_1{}^m) + (1.5681 * \hat{p}_2{}^m) + (-1.4040 * \hat{p}_3{}^m)$$

$$m_3 = 0.6990 + (0.0583 * \hat{p}_1{}^m) + (0.9286 * \hat{p}_2{}^m) + (2.5996 * \hat{p}_3{}^m).$$

19. The apparatus of claim 13 where the processor linearly transforms between coordinates in a three-dimensional Euclidean color space and coordinates in a Munsell or an OSA-UCS system.

20. The apparatus of claim 13 where the processor generates a reconstructed spectrum of a superset of spectra comprised of all possible cube root reflectance spectra in a color atlas generated by linear combinations of the three basis functions.

21. The apparatus of claim 20 where the processor reconstructs the cube root spectrum of a combination of two or more cube root spectra within the superset by convex combination.

22. The apparatus of claim 13 where the processor quantitatively matches the target color for reproducing color work or determining mixtures of colors in printing and painting, where the target color is characterized in the perceptual space of color appearance by performing the steps of generating a cube root reflectance spectrum of the physical reflectance spectrum, reconstructing the cube root reflectance spectrum by a weighted linear combination of three basis functions, the weights of a linear combination of the basis functions constituting coordinates in a physical Euclidean color space with respect to which Euclidean color space similarities and differences between the physical reflectance spectra and a color characterized in the perceptual space of color appearance can be quantitatively analyzed, and linearly transforming a quantitative characterization of a target color between the physical Euclidean color space and the perceptual space of color appearance by which transformation the target color can be quantitatively compared.

23. A non-transitory computer-readable storage medium with an executable program stored thereon, wherein the program instructs a microprocessor to perform the following steps:
   obtaining a physical reflectance spectrum in a selected spectral range of a reflected color of an object;
   generating a cube root reflectance spectrum of the physical reflectance spectrum;
   reconstructing the cube root reflectance spectrum by a weighted linear combination of three basis functions, the weights of a linear combination of the basis functions constituting coordinates in a physical Euclidean color space with respect to which Euclidean color space similarities and differences between the physical reflectance spectra and a color characterized in the perceptual space of color appearance can be quantitatively analyzed; and
   linearly transforming a quantitative characterization of a target color between the physical Euclidean color space and the perceptual space of color appearance by which transformation the target color can be quantitatively compared.

24. A non-transitory computer-readable storage medium with an executable program stored thereon, wherein the program instructs a microprocessor to process data to generate a cube root spectrum of a reflectance spectrum in at least a portion of a selected spectral range, to reconstruct the cube root of the physical reflectance spectrum by a weighted linear combination of three basis functions, the weights of the linear combination of the basis functions constituting the coordinates in a three-dimensional Euclidean color space with respect to which similarities and differences among reflectance spectra in metric terms and a color characterized in a perceptual space of color appearance can be characterized, and linearly transforming a quantitative characterization of a target color between the physical Euclidean color space and the perceptual space of color appearance.

* * * * *